united States Patent Office 3,302,808
Patented Feb. 7, 1967

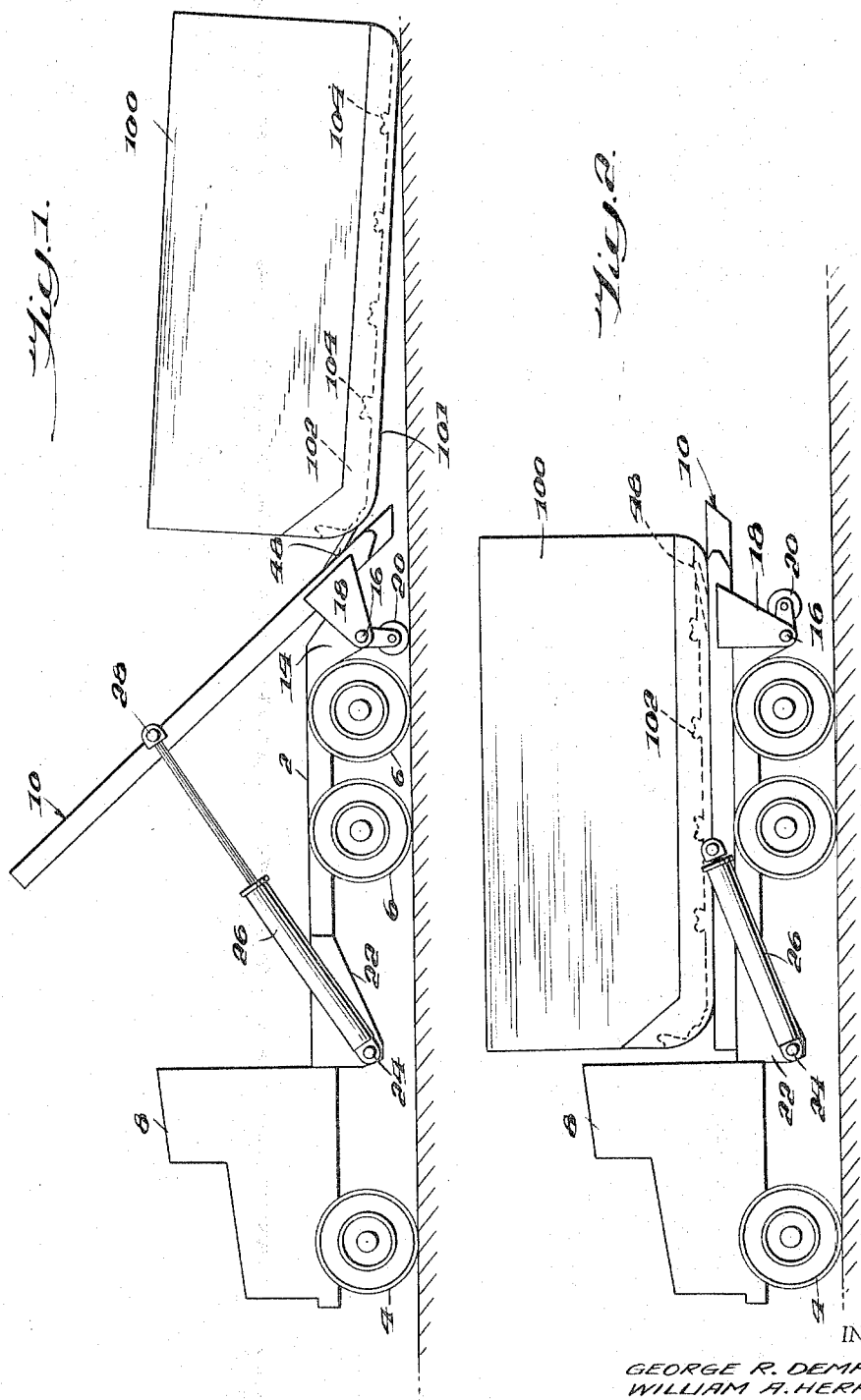

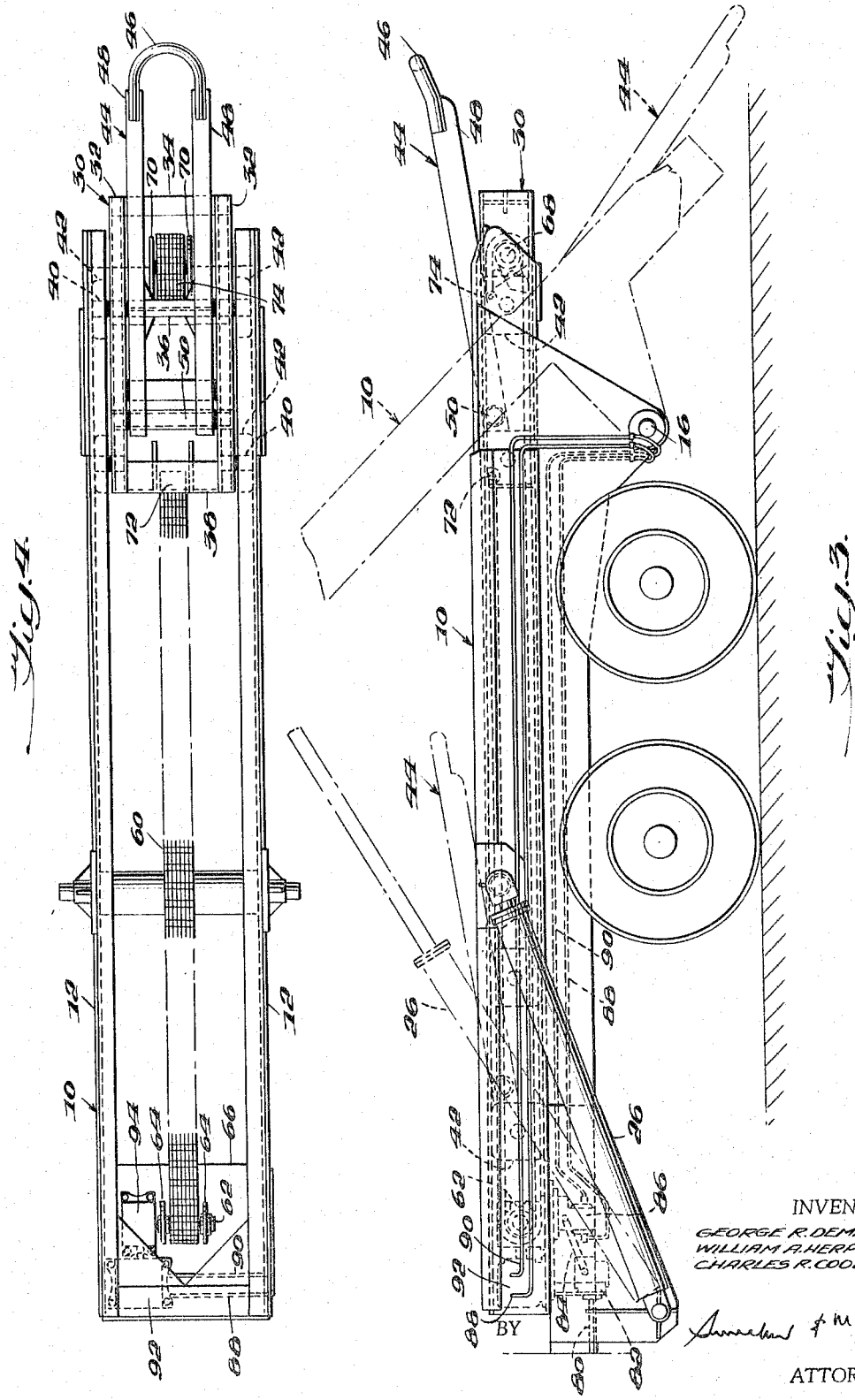

3,302,808
CONTAINER LOADING AND UNLOADING MECHANISM
William A. Herpich, 739 Hardin Way W., Galion, Ohio 44833; Charles R. Cooley, P.O. Box 21–66, Louisville, Ky. 40201; and George R. Dempster, deceased, late of Knoxville, Tenn., by Trust Company of Georgia, executor, Atlanta, Ga. 30303
Original application Sept. 22, 1960, Ser. No. 57,732, now Patent No. 3,214,045, dated Oct. 26, 1965. Divided and this application Jan. 11, 1965, Ser. No. 426,471
5 Claims. (Cl. 214—505)

This application is a division of our prior application Serial No. 57,732, filed September 22, 1960, now Patent No. 3,214,045. This application claims structure disclosed in part in prior application Serial No. 744,107, filed June 24, 1958, by a different inventorship, now Patent No. 3,144,149, granted August 11, 1964.

This invention is related to improvements in container loading and unloading mechanism whereby large-sized containers may be loaded and unloaded with respect to a transport vehicle that is separable therefrom.

It is often desirable to use large capacity containers for holding various types of lading and to provide for the picking up and unloading of the containers with respect to a vehicle so that the containers may be transported. Such a container may be filled when resting on the ground or other surface, after which it may be picked up by a vehicle and transported to a distant point where it can be unloaded from the vehicle or the contents discharged therefrom. If the container remains on the vehicle, it may be returned to the location of filling or to a new location and placed on the ground again for refilling.

Previous types of mechanism for picking up and unloading large containers from vehicles have used cable-type hoisting devices, but these have not been entirely satisfactory. The undesirable features of apparatus employing cables include the fact that cables not infrequently break and therefore the use of cables can be hazardous. Also, the use of cables does not afford the desirable control over the movement of the containers.

Certain other types of container loading mechanism accomplish this operation without the use of cables. Such mechanism instead uses hydraulically powered apparatus that is capable of handling containers which are usually the size of a normal truck body. This hydraulically powered apparatus employs a cylinder and piston device for pulling the container onto the vehicle and for removing the container from the vehicle. Although this apparatus has proved to be satisfactory in the past, it has been found that an improvement resides in the use of hydraulically powered apparatus whereby the container is moved onto or off of the vehicle by means of a chain driven mechanism which provides a continuous motion.

One object of this invention is to improve the construction of equipment for handling a detachable body or container for the loading and unloading of the same with respect to a vehicle chassis.

Another object of this invention is to provide hydraulically operated mechanism for picking up and loading a large-sized container onto a chassis of a vehicle or for removing the container from the vehicle in one continuous motion.

Another object of this invention is to provide apparatus for loading or for unloading a large-sized container with respect to the chassis of a vehicle wherein a safe and positive connection is established between the separable container and the apparatus.

These objects may be accomplished according to one embodiment of the invention by constructing a detachable container with means on the body thereof which may be engaged for moving the container continuously in its progress onto or off of the transport vehicle. The supporting structure of the separable container may be provided with a series of hook stations spaced at intervals along the length thereof in positions for engagement by a bail mechanism mounted on a carriage. The carriage is power operated to move in a reciprocating manner along the length of the vehicle.

The vehicle chassis is constructed with a tilting frame mounted thereon and means are provided for raising and lowering the frame with respect to the chassis. The carriage is mounted on and guided by the tilting frame so as to permit proper reciprocating movement of the bail lengthwise with respect to the vehicle and the container.

The bail may be moved into engagement with the hook stations provided on the container and the bail acts thereon to cause movement of the separable container onto or off of the tilting frame of the vehicle. Movement of the bail and carriage is accomplished by hydraulically powered apparatus which drives a chain connecting the power apparatus and the carriage.

This embodiment of the invention is illustrated in the accompanying drawings, in which:

FIG. 1 is a side elevation view showing a separable container in position to be moved onto the tilting frame of a vehicle;

FIG. 2 is a similar side elevation view showing a separable container loaded onto the vehicle;

FIG. 3 is an enlarged elevation view showing a rear portion of the vehicle and the container loading and unloading apparatus with the tilting frame illustrated in various positions; and FIG. 4 is a plan view of portions of the structure shown in FIG. 3.

The invention is illustrated as applied to a motor vehicle chassis of conventional form wherein the chassis frame indicated generally at 2 is supported by a front wheel and axle assembly 4 and rear wheel and axle assemblies 6. The vehicle is power driven in the usual manner under control of an operator located within a cab 8.

The chassis frame should be of sufficient length to receive thereon a large size container of the order of a vehicle body. If desired, the chassis frame may be that of a conventional trailer, separated from the tractor portion of the vehicle, although functioning otherwise in the same manner as described.

Mounted on the chassis frame 2 is a tilting frame, generally indicated at 10, in such position as to be disposed directly over the chassis frame 2. The tilting frame 10 extends lengthwise of the chassis 2 and includes a pair of longitudinal channels or side members 12 (FIG. 4) on opposite sides of the tilting frame in vertical alignment with sides of the chassis 2. The channels 12 are suitably braced and spaced apart by intermediate connecting members which cooperate to form a unitary structure. The top surfaces of the channels 12 are suitably strong and unobstructed so that a container may slide therealong during its movement onto or off of the vehicle.

At the rear end of the chassis frame 2, at each lateral side thereof, is a depending bracket 14. Supported upon the brackets 14 is a pivot shaft 16 which pivotally supports a pair of brackets 18 which are connected rigidly with the rear end portion of the tilting frame 10. In this manner, the tilting frame 10 is pivotally mounted on the rear of the chassis 2 for swinging movement relative thereto as illustrated in FIGS. 1 and 2.

The rear end portion of the tilting frame 10 may be provided with a stabilizing jack, if desired or needed, for accommodating abnormally heavy loads. One form of jack is shown in FIGS. 1 and 2 as including a roller 20 mounted with respect to the pivot shaft 18 for raising and lowering movements with respect thereto under control of a suitable power device. In FIG. 1 the roller 20 is shown in its lowered position for supporting the rear of the vehicle, and in FIG. 2 it is shown in a raised position. Reference may be made to Patent No. 3,107,021, granted October 15, 1963, wherein such a roller device is described in detail.

At the forward end portion of the tilting frame 10 the chassis 2 is provided with depending brackets 22 welded or otherwise secured rigidly to the members of the chassis frame. The brackets 22 support for pivotal movement a shaft 24 which extends transversely of the vehicle.

Mounted on the outer projecting ends of the shaft 24 are the lower ends of hydraulic power devices or cylinders 26, the upper ends of which are pivotally connected at 28 with opposite sides of the tilting frame 10. The hydraulic power devices 26 are of any suitable or desired form with a cylinder and piston assembly for each capable of telescoping movement in raising and lowering the tilting frame 10 relative to the chassis frame 2. For example, the tilting frame 10 can be raised by the power devices 26 to the position shown in FIG. 1, and from this position, moved to the lowered position shown in FIG. 2.

The channel members 12 of the tilting frame 10 form opposed trackways receiving therebetween a carriage 30. The carriage 30 includes a pair of channel-shaped side rails 32 spaced apart and located in relatively close relation to the inner faces of the channel members 12. These longitudinal side members 32 are suitably held in spaced relation and braced by a rear cross member 34, an intermediate cross member 36, and a forward cross member 38. Additional cross members and bracing may be provided for the carriage 30 as needed.

Mounted on the respective side members 32 and extending laterally in opposite directions therefrom at longitudinally spaced points are stub axles 40. Mounting members 42 are supported on the axles 40 and may be in the form of rollers if desired, although slides or other suitable means may be employed such as rectangular-shaped block members. These mounting members 42 form bearing supports within the channels 12 for guiding the carriage 30 lengthwise of the tilting frame 10 during reciprocating movements.

Mounted on the carriage 30 is a container-connecting member or bail 44 comprised of side members 48 which are connected by a closed or loop section 46 at the rear end thereof. The bail side members 48 extend forward to the carriage 30 between the side rails 32, and are supported at their forward ends on a pivot rod 50 which extends between the side rails 32. In this manner, the bail 44 may swing vertically relative to the carriage 30 about the axis of the rod 50.

For a further explanation of the tilting frame, carriage, and bail, reference may be made to companion applications Serial No. 106,427, filed April 20, 1961, now Patent No. 3,144,149, granted August 11, 1964, and Serial No. 800,320, filed March 18, 1959, now Patent No. 3,107,020, granted October 15, 1963.

A flexible chain 60 for providing a driving connection to the carriage 30 is provided and extends longitudinally along the tilting frame 10. At the front of the tilting frame 10 the chain 60 is supported by and turns about a drive sprocket 62 journaled in bearing blocks 64, which are mounted on a plate 66 attached to the side members 12 of the tilting frame 10. At the rear of the tilting frame 10 the chain 60 is supported by and turns about an idler sprocket 68 journaled in bearing blocks 70 which are suitably mounted on the tilting frame. If desired, the drive sprocket could be placed at the rear and the idler sprocket placed at the front of the tilting frame.

One end of the chain 60 is connected to the carriage 30 by means of a front chain connector 72. This connection to the carriage 30 may be made at the front cross member 38. The other end of the chain 60 is connected to the carriage 30 by means of a rear chain connector 74, and this connection may be made at the intermediate cross member 36.

The drive sprocket 62 is operated by power means which may include a drive shaft 80 from the power take-off of the vehicle for driving an hydraulic pump 82 which is connected to a reservoir supply of hydraulic fluid. Fluid under pressure from the hydraulic pump 82 is supplied through a line 84 to a control valve 86. Suitable means may be provided whereby the operator may control the valve 86 while sitting in the cab 8. At the control valve 86 the fluid is directed into either one of the supply lines 88 or 90 for driving an hydraulic motor 92 in either rotational direction. The hydraulic motor 92 is connected to a reduction gear train 94 which in turn drives the chain sprocket 62 around which the chain 60 extends.

In this manner by suitable control over the valve 86, the operator may cause the hydraulic motor 92 to rotate in either rotational direction thereby causing the chain 60 to move the carriage 30 in a reciprocating manner between the front and the rear of the tilting frame 10. Suitable means may be provided for directing the flow of the fluid after the carriage 30 has reached either the rear or the front of the tilting frame 10, and for returning the fluid to the reservoir.

The detachable container used in connection with the vehicle and tilting frame structure is illustrated in FIGS. 1 and 2, and indicated by reference numeral 100. The dimensions of the container from front to rear should be proportioned so that the container may be received by the vehicle chassis frame 2 as shown in FIG. 2. Except for this one dimension of the container, it may be of any suitable size and type as desired. For example, the containers which may be handled by the vehicle may have an open or a closed top and have various combinations of lids, doors and tailgates. The character of the containers depends on the type of material to be handled.

Each container 100 is provided with a subframe structure which includes beams 101 extending lengthwise thereof. These beams form runners for supporting the container 100 upon the top surfaces of the side members 12 of the tilting frame 10. The forward ends of the beams 101 are curved in the form of bows to facilitate the guiding of the container 100 onto the tilting frame 10. Suitable braces and rib members may be employed as necessary to strengthen the subframe structure.

Extending lengthwise of the container 100 between the sides thereof is a hook bar 102 which extends preferably throughout the length of the container. The hook bar 102 is provided with a plurality of hook stations 104 spaced along the length thereof for engagement of the loop portion 46 of the bail 44. The number and spacing of the hook stations 104 may vary depending upon the length of the container. Each hook station 104 is formed with a pair of opposed hook surfaces opening downwardly, either one of which may be engaged by the loop portion 46 of the bail 44 so that the carriage 30 may pull the container 100 onto the tilting frame 10 or push the container off of the tilting frame.

The container 100 may be filled, if desired, separate and apart from the vehicle chassis while sitting on the ground or some other supporting surface. After the container has been filled, it may be loaded onto the vehicle and transported to a remote point where the contents of the container may be removed. The container may then be brought back to the same place or to a different place for refilling. Any type of lading that is suitable for the container may be handled.

In picking up or loading the container, the vehicle is backed up to the front end portion of the container while the latter is resting on the ground or other supporting surface, so that the rear of the vehicle is at or in close proximity to the front end of the container. Then, by operation of the cylinders 26, the tilting frame 10 can be moved to an upwardly inclined position about its pivot shaft 16, as shown in FIG. 1.

If the stabilizing jack is used, the roller 20 may be swung to engagement with the ground. This will aid in supporting and stabilizing the rear of the vehicle during the moving of the container 100 onto the tilting frame 10.

With the tilting frame 10 up, the operator may then actuate the power mechanism, and by properly controlling the valve 86 move the carriage 30 to the lower end of the tilting frame 10. The bail 44 normally is in a raised position with respect to the carriage 30, as shown in FIG. 2. The bail 44 will be projected below the lower end of the inclined tilting frame 10 and beneath the forward end of the container 100.

If the vehicle and the container 100 are properly aligned, the bail 44 will be centered under the front portion of the hook bar 102. The loop portion 46 of the bail 44 may then engage one of the front hook stations 104. The angle of the tilting frame 10 may be varied under control of the operator by a proper manipulation of the cylinders 26 so as to cause the loop portion 46 to properly enter one of the hook stations.

After hook engagement with the container in this manner, the operator may then manipulate the valve 86 to move the carriage 30 toward the front of the vehicle in a continuous motion. This will pull the container 100 onto the tilting frame 10. Thereafter, the carriage 30 and the bail 44 can be moved rearwardly so that the loop portion 46 of the bail might engage an intermediate hook station or the hook station at the extreme rear of the container. Upon forward movement of the carriage 30 again, the container 100 will be pulled further onto the tilting frame 10. As the container is thus pulled on the tilting frame, the beams will skid along the upper surface of the side members 12. While the container is being pulled onto the tilting frame, the operator may lower the tilting frame by proper manipulation of the cylinders 26.

In order to unload or discharge a container 100 from the vehicle, the loading operation is reversed. The loop portion 46 of the bail 44 is engaged in one of the intermediate hook stations 104, and the carriage 30 is moved to the rear of the tilting frame 10 by proper manipulation of the valve 86. This reversed movement of the carriage 30 and the container may be continued until the container has been moved to the rear of the tilting frame 10. At this point, it may be necessary to move the carriage 30 a short distance forward on the tilting frame so that the loop portion 46 may engage one of the front hook stations 104. Thereafter, the carriage 30 may be moved to the rear of the vehicle to push the container 100 completely off the vehicle.

The tilting frame can be varied in its angle of tilting movement from horizontal to inclined in order to facilitate the unloading of the container. The container can be set on a loading dock, railroad car or other platform which is no higher than the tilting frame in level position, or the container can be set on the ground. If the container is to be set on a platform, the tilting frame need not be elevated, or elevated only slightly. The final removal of the container from the tilting frame 10 is completed by pushing the container, or by pulling the vehicle away.

It will be apparent that the mechanism described is quite versatile in loading large size containers onto a vehicle. With this mechanism, control over movement of the container is maintained throughout a loading or unloading operation. The use of cables, which has been employed in the past, is completely eliminated. The loading and unloading operations of the container may be carried out by the operator without the need for him to leave the cab of the vehicle.

While the invention has been illustrated and described in one embodiment, it is recognized that variations and changes may be made therein, without departing from the invention as set forth in the claims.

We claim:

1. In transporting equipment of the character described, the combination with a motor vehicle chassis, of a tilting frame extending lengthwise of the chassis, means mounting the tilting frame on the chassis for swinging movement to raised and lowered positions with respect thereto, a separate container adapted to be loaded separate and apart from the chassis, sprockets mounted at opposite ends of the tilting frame, power driven chain means extending between the sprockets, and means attached to the chain means for detachable engagement with the container and being operable upon movement forward in one direction to engage the container at one point and then back in the opposite direction to move the container one step and thereafter forward again and into engagement with the container at a second point and then back to move the container a second step for moving the container onto or off of the tilting frame.

2. In transporting equipment of the character described, the combination with a motor vehicle chassis including a chassis frame, of a tilting frame having spaced-apart side members extending lengthwise of the chassis adapted to receive a container thereon, means mounting an intermediate portion of the tilting frame on the chassis for swinging movement to raised and lowered positions with respect thereto and with an end portion of the tilting frame appreciably below the chassis frame, means mounted on and guided by the side members of the tilting frame for reciprocating movements along the tilting frame and adapted for detachable engagement with the container, and flexible drive means between the tilting frame and last-mentioned means for effecting movement thereof to pull or push the container onto or off of the side members of the tilting frame.

3. In transporting equipment of the character described, the combination with a motor vehicle chassis including a chassis frame, of a tilting frame having spaced-apart side members extending lengthwise of the chassis, means mounting an intermediate portion of the tilting frame on the chassis for swinging movement to raised and lowered positions with respect thereto and with an end portion of the tilting frame appreciably below the chassis frame, a separate container adapted to be loaded separate and apart from the chassis, carriage means mounted on and guided by the side members of the tilting frame for reciprocating movements along the tilting frame, container engagement means pivotally mounted on the carriage means and adapted for detachable engagement with the container, chain drive means supported at and extending between the ends of the tilting frame for effecting movements of the carriage means to pull or push the container onto or off of the side members of the tilting frame in a continuous motion and while the frame is tilted appreciably below the chassis frame.

4. In transporting equipment of the character described, the combination with a motor vehicle chassis, of a tilting frame having spaced-apart side members extending lengthwise of the chassis, means mounting an intermediate portion of the tilting frame on the chassis for swinging movement to raised and lowered positions with respect thereto, a separate container adapted to be loaded separate and apart from the chassis, said container having a plurality of hook stations spaced at intervals therealong, carriage means mounted on and guided by the side members of the tilting frame for reciprocating movement with respect thereto, flexible drive means mounted on and extending along the tilting frame for causing said movement of the carriage means, and bail means pivotally mounted on the carriage means and resiliently biased to a position above the side members for engaging the container at the hook stations for moving the container upon reciprocation of the carriage means.

5. In transporting equipment of the character described, the combination of a motor vehicle having a chassis frame, a tilting frame extending lengthwise of the chassis frame and beyond the rear end thereof adapted to receive a container thereon, means pivotally mounting the tilting frame intermediate the length thereof on the rear end of the chassis frame for swinging movement of the tilting frame relative thereto and with the rear end of said tilting frame appreciably below the chassis frame, guide means mounted on opposite ends of the tilting frame, a flexible device extending over the guide means for rectilinear movement along the tilting frame, and means connected with the flexible device and movable thereby for connection and disconnection with the container at the lower end of the tilting frame in tilted position and at any point along the length of the tilting frame.

References Cited by the Examiner

UNITED STATES PATENTS

| | | | |
|---|---|---|---|
| 1,821,327 | 9/1931 | Scott | 214—516 |
| 2,805,784 | 9/1957 | Dokken | 214—83.36 |
| 3,107,020 | 10/1963 | Dempster et al. | 214—516 X |

GERALD M. FORLENZA, *Primary Examiner.*

HUGO O. SCHULZ, *Examiner.*

A. J. MAKAY, *Assistant Examiner.*

UNITED STATES PATENT OFFICE
CERTIFICATE OF CORRECTION

Patent No. 3,302,808                      February 7, 1967

William A. Herpich et al.

It is certified that error appears in the above identified patent and that said Letters Patent are hereby corrected as shown below:

In the heading to the printed specification, after line 8, insert -- said Cooley and said Herpich assors. to Dempster Brothers, Inc., Knoxville, Tenn., a corporation of Tennessee --.

Signed and sealed this 20th day of October 1970.

(SEAL)
Attest:

Edward M. Fletcher, Jr.
Attesting Officer

WILLIAM E. SCHUYLER, JR.
                                         Commissioner of Patents